United States Patent
Kraag Henriksen

(10) Patent No.: US 9,149,733 B2
(45) Date of Patent: Oct. 6, 2015

(54) TOY BRICK, A METHOD OF MANUFACTURING A TOY BRICK AND A MOULDING TOOL FOR THE MANUFACTURE OF A TOY BRICK

(71) Applicant: LEGO A/S, Billund (DK)

(72) Inventor: Preben Kraag Henriksen, Vorbasse (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 14/412,659

(22) PCT Filed: Jul. 9, 2013

(86) PCT No.: PCT/EP2013/064447
§ 371 (c)(1),
(2) Date: Jan. 2, 2015

(87) PCT Pub. No.: WO2014/009345
PCT Pub. Date: Jan. 16, 2014

(65) Prior Publication Data
US 2015/0147933 A1    May 28, 2015

(30) Foreign Application Priority Data

Jul. 11, 2012    (DK) ................................ 2012 70421

(51) Int. Cl.
*A63H 33/08*    (2006.01)
*B29C 45/26*    (2006.01)

(52) U.S. Cl.
CPC .............. *A63H 33/08* (2013.01); *A63H 33/086* (2013.01); *B29C 45/26* (2013.01)

(58) Field of Classification Search
USPC ......... 446/115, 116, 117, 120, 121, 124, 125, 446/128
See application file for complete search history.

(56) References Cited

U.S. PATENT DOCUMENTS

| 4,964,833 | A |   | 10/1990 | Suzuki |
| 5,848,927 | A | * | 12/1998 | Frederiksen .................. 446/128 |
| 6,050,044 | A | * | 4/2000  | McIntosh ..................... 52/591.1 |

(Continued)

FOREIGN PATENT DOCUMENTS

| CN | 201 643 723 U | 11/2010 |
| WO | 00/41791 A1 | 7/2000 |
| WO | 2010/145660 A1 | 12/2010 |

OTHER PUBLICATIONS

International Search Report in corresponding international application No. PCT/EP2013/064447, mailed on Aug. 2, 2013.

*Primary Examiner* — Kurt Fernstrom
(74) *Attorney, Agent, or Firm* — Day Pitney LLP

(57) ABSTRACT

A toy brick comprising: a body part with one or more sidewalls extending around the outer periphery of the toy brick which at least partially define an interior of the toy brick and extend from a bottom face to a top portion of the body part, and an elongated rib arranged interiorly on one of the one or more sidewalls. The elongated rib extends at least partially between the bottom face towards the top portion of the body part and the elongated rib is, upon interconnection with another toy brick, configured to be in abutment on coupling means with the other toy brick, the width of the elongated rib, in a central portion in-between the bottom face and the top portion and parallel to the sidewall accommodating the elongated rib, is greater than the width of the elongated rib near its ends parallel to the sidewall accommodating the elongated rib.

12 Claims, 2 Drawing Sheets

(56) References Cited

U.S. PATENT DOCUMENTS

| | | | |
|---|---|---|---|
| 6,086,444 A * | 7/2000 | Glickman | 446/124 |
| 6,554,676 B1 * | 4/2003 | Bach | 446/116 |
| 6,645,033 B1 * | 11/2003 | Thomsen | 446/120 |
| 6,648,715 B2 * | 11/2003 | Wiens et al. | 446/121 |
| D616,046 S * | 5/2010 | Hwang | D21/501 |
| 8,105,128 B1 | 1/2012 | Sorensen et al. | |
| 8,771,032 B2 * | 7/2014 | Chang et al. | 446/124 |
| 2013/0252503 A1 * | 9/2013 | Kwok et al. | 446/102 |

\* cited by examiner

TOY BRICK, A METHOD OF MANUFACTURING A TOY BRICK AND A MOULDING TOOL FOR THE MANUFACTURE OF A TOY BRICK

CROSS-REFERENCE TO RELATED APPLICATIONS

This application is a U.S. National Stage of International Application No. PCT/EP2013/064447, filed on 9 Jul. 2013 and published on 16 Jan. 2014, as WO 2014/009345 A1, which claims the benefit of priority to Danish Patent Application No. PA 2012 70421, filed on 11 Jul. 2012.

BACKGROUND OF THE INVENTION

The present invention relates, according to a first aspect, to a toy brick comprising:
A body part with one or more sidewalls extending around the outer periphery of the toy brick. The one or more sidewalls at least partially define an interior of the toy brick and the sidewalls extend from a bottom face to a top portion of the body part,
An elongated rib arranged interiorly in the body part. The elongated rib extends essentially between the bottom face towards the top portion of the body part,
A width of the elongated rib, in an end portion near the top portion and parallel to a portion of a face accommodating the elongated rib, which width near the top portion is greater than or equal to the width of the elongated rib near its end, facing the bottom face.

The body part may form part of a complex toy brick and the like.

The elongated rib may constitute a raised ridge or similar projecting from a surface such as a wall or an internal pipe etc. The elongated rib may serve multiple purposes such as to contribute to structural integrity of an item or to contribute to functional properties of an item.

According to a second aspect, the present invention relates to a method of manufacturing a toy brick.

According to a third aspect, the present invention relates to a moulding tool for manufacturing a toy brick.

According to other aspects, the present invention relates to a plastic product or item, a method of manufacturing a plastic product and a moulding tool for manufacturing a plastic product.

WO 2010/145660 A discloses a building element, a method of making a building element and a moulding tool for the manufacture of a building element. The building element constitutes a building brick including sidewalls that are undercut at least in an area where the brick abut on a coupling stud of another building brick. The undercut is located a distance from the lower-most edge corresponding to the height of the coupling stud of the other building brick. This to the effect that the complementarily configured surfaces adjoin the cylinder faces on coupling stud at least a distance below the top of the coupling stud. By this, a building element which takes into account the wish for a stable and adequate retention force, while simultaneously it is simple and easy to interconnect with other building elements.

U.S. Pat. No. 8,105,128 B1 discloses an injection moulded toy building element which in its interior has at least one hollow member which is open through the extended upper surface, and has an outward slope, in a direction extending from the bottom towards the top. The purpose of the hollow member being open to the extended upper surface is to facilitate the formation of the hollow member and the removal thereof from the mould parts.

Building elements of the type according to an aspect of the present invention advantageously are manufactured by a method that comprises injection moulding in two or more steps. The method includes an injection moulding step wherein the building element typically is injection moulded in one overall moulding step.

The building element may be injection moulded in a mould cavity with an internal mould space having a shape that corresponds to the outer shape of the building element. The mould typically constitutes a two part mould where one part of the mould defines the underside, or the interior, of the building element and the other part of the mould defines the upper face and the exterior of the building element.

The building element is moulded by means of injecting hot material into the compiled moulds and subsequently, when various parameters such as temperature reach a predetermined range, separating the moulds.

Upon separation of the moulds, and subsequent removal of the element from one of the mould parts, the building element typically constitutes a finished product.

In order to control large scale manufacture of injection moulded items such as manufacture of building elements made of plastic, removal of the item or items from the mould may involve several steps of high sophistication. Typically, the items as well as one or more of the moulds, are designed to, upon separation of the moulds; maintain the item on or in the same mould part upon separation of the moulds.

The mould part on or in which the item is designed to stay or reside upon mould separation, typically is provided with means configured for removing or detaching the item from the mould. The means may constitute a mechanical ejector or equivalent. Up to this day, items such as toy bricks and the like typically are produced by injection moulding, and the items often includes one or more barbs or protrusions having the sole purpose of maintaining the item on the same part of the mould when the mould parts are separated. During subsequent removal of the item from the mould part on or in which the item resides, the barbs are, by means of an ejector and sometimes also assisted by a ramp effect caused by shrinkage of the item during cooling, forced out of a cavity in the mould part shaping the barb. This method may damage the items as the items are exposed to sometimes violent and unevenly distributed forces during ejection from the mould.

The damages may constitute cosmetic as well as mechanical damages.

SUMMARY OF THE INVENTION

It is an object of the present invention to set forth a solution to the abovementioned insufficiencies of today's practices.

According to the present invention, the above object is met inter alia by the provision of a toy brick according to the introductory part of this specification wherein the width of the elongated rib, in a central portion in-between the bottom face and the top portion and parallel to a portion of a face accommodating the elongated rib, is greater than the width of the elongated rib, in the end portion near the top portion, parallel to a face whereon the elongated rib is disposed.

The above configuration of the elongated rib will ensure that the toy brick, or item, is maintained in or on the mould part forming the elongated rib.

By this, any deformation and consequently any damage to the item as a result of removal or ejection from the mould is avoided as the forces inflicted on the item during removal from the mould are distributed locally in the elongated rib.

According to one embodiment the thickness of the elongated rib, perpendicular to a sidewall accommodating the elongated rib may be greater in a portion near the top portion than the thickness of the elongated rib in a portion near the bottom face of the body part.

According to one embodiment, the body part may be formed without barbs projecting from an interior face of the body part. By this, material is saved and an aesthetically appealing product is obtained.

According to one embodiment, the body part may constitute an essentially box-shaped body part with a top face, a bottom face and at least two opposed and essentially parallel sidewalls extending from the bottom face to the top face of the box-shaped body part.

According to one embodiment, the body part may include at least one coupling stud configured to extend a given height above the top portion. The coupling stud may have a continuous abutment face shaped as a cylinder face whose generatrices extend approximately at right angles from the top portion of the body part to the top of the coupling stud.

According to one embodiment, the at least one coupling stud may be essentially circular.

According to one embodiment, the elongated rib may extend essentially perpendicular to a lower edge of the one or more sidewalls.

According to one embodiment, the body part may comprise a plurality of elongated ribs disposed on inner and opposed faces of the sidewalls.

According to one embodiment, the body part may have a rectangular bottom face. Further, the sidewalls of the body part may extend from each of the sides of the rectangular underside of the body part. Complementarily configured surfaces may be arranged in pairs opposite each other on two parallel and opposite sidewalls of the body part.

According to one embodiment, the toy brick may constitute a toy building brick.

According to a second aspect of the present invention, a method for manufacturing an item, or a toy brick, is disclosed. The method includes a step of injection moulding an item or a toy brick in a mould that comprises at least two mould parts, where one of the mould parts comprises a mould core which shapes the inner and opposed faces of the box-shaped body part. The mould core comprises undercuts configured to form an elongated rib as disclosed herein.

According to a third aspect of the present invention, a moulding tool for use in the manufacture of an item, or a toy brick, is disclosed. The mould comprises at least two mould parts, where one of the mould parts comprises a mould core which shapes the inner and opposed faces of the box-shaped body part. The mould core comprises undercuts configured to form one or more elongated ribs as disclosed herein.

DETAILED DESCRIPTION OF THE INVENTION WITH REFERENCE TO THE FIGURES

The invention will in the below be explained in further detail with reference to an arbitrary embodiment as shown in the figures.

According to the first aspect, the present invention may constitute a toy brick, such as a LEGO® brick or similar.

The toy brick 1, or item according to other aspects of the present invention, may, with reference to FIGS. 1 to 4, comprise a body part 3 with one or more sidewalls 5 extending around the outer periphery of the toy brick 1. The sidewalls 5 at least partially define an interior, or cavity 25, within the toy brick 1.

Figure 3:
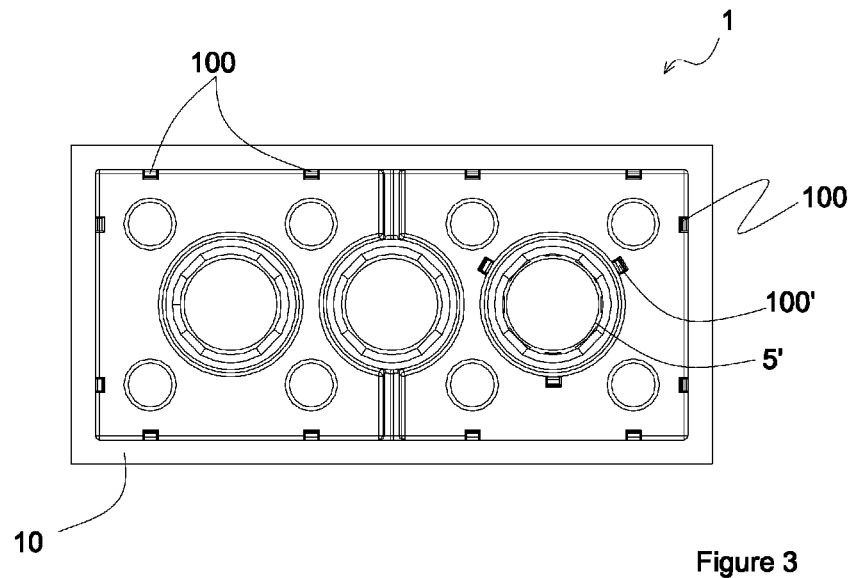
FIG. 3 illustrates a bottom view of a toy brick.
Figure 4:
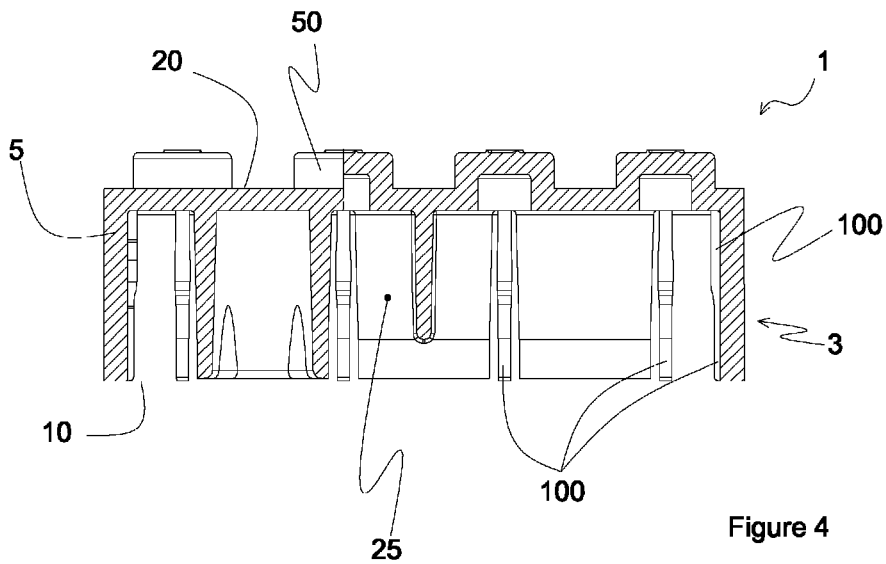
FIG. 4 illustrates different sectional views through the toy brick according to FIG. 3.

As can be seen in FIGS. 3 and 4, the sidewalls 5 may extend from a bottom face 10 to a top portion 20 of the body part 3 of the toy brick 1.

Figure 1:
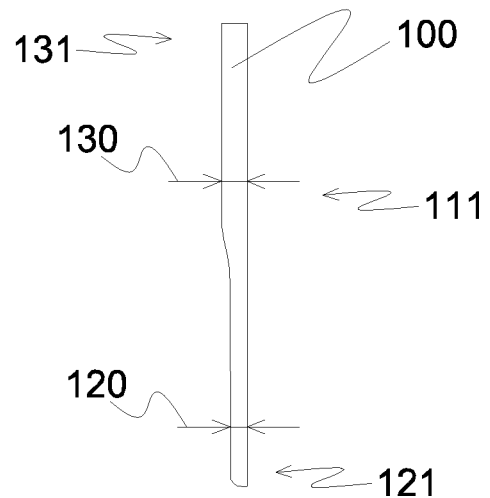
FIG. 1 illustrates a side view of an elongated rib.
Figure 2:
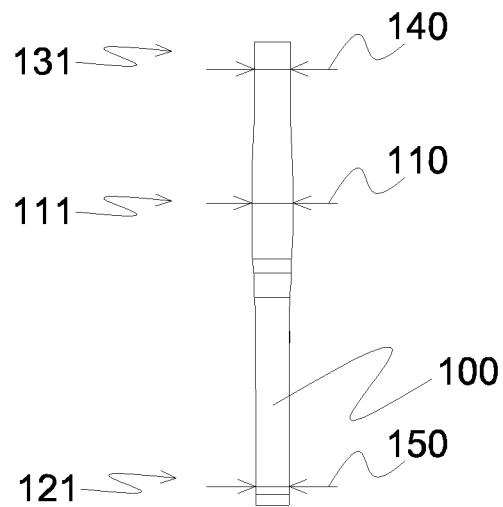
FIG. 2 illustrates a front view of an elongated rib.

An elongated rib 100 is shown independently in FIGS. 1 and 2. FIGS. 3 and 4 shows a plurality of elongated ribs 100 disposed on interior faces of the toy brick 1.

As can be seen in FIGS. 3 and 4, the elongated ribs 100 may be arranged interiorly 25 on one or more of the sidewalls 5. The elongated rib 100 may, as shown, extend essentially between the bottom face 10 of the toy brick 1 towards the top portion 20 of the toy brick 1. The elongated rib 100 may, optionally, be configured to, upon interconnection with another toy brick, be in abutment on coupling means with the other toy brick.

As shown in FIG. 2, a width 110 of the elongated rib 100, in a central portion 111 in-between an end portion 121 near the bottom face 10 and an end portion 131 near the top portion 20 of the body part 3, measured parallel to a not shown sidewall accommodating the elongated rib 100, may be greater than a width 150 of the elongated rib 100 in its end portion 121, facing the bottom face 10, and likewise be greater than a width 140 of said elongated rib 100, in the end portion 131 near said top portion 20, again measured parallel to the sidewall 5 accommodating the elongated rib 100.

The above configuration of the elongated rib 100 will ensure that the toy brick 1, or item, is maintained in or on the not shown mould part forming the elongated rib 100. Further, any deformation of the sidewalls 5, and consequently any damage to the item or toy brick 1 as a result of removal or ejection from the mould, is avoided as the forces inflicted on the item during removal from the mould are distributed locally in the elongated rib 100.

As shown in FIG. 1, the thickness 130, in the central portion 111 and/or in the end portion 131 near the top portion 20 of the body part 3 of the elongated rib 100, measured perpendicular to the sidewall 5 accommodating the elongated rib 100, is greater in the end portion 131 near the top portion 20 of the body part 3 than a thickness 120 of the elongated rib 100 measured perpendicular to the sidewall 5 accommodating the elongated rib 100 measured in the end portion 121 near the bottom face 10 of the body part 3.

The application and combination of features and solutions presented by the present invention is not limited to the presented embodiments. One or more features of one embodiment can and may be combined with one or more features of other embodiments, whereby not described but valid, embodiments of the present invention may be obtained.

The term "comprises/comprising/comprised of" when used in this specification incl. claims is taken to specify the presence of stated features, integers, steps or components but does not preclude the presence or addition of one or more other features, integers, steps, components or groups thereof.

End portions 121, 131 should be understood as ends of the elongated rib 100. These ends 121, 131 can also form transitions into the toy brick 1 in such a way that the material from the elongated rib 100 continues into the underside of the top portion 20 in one end 131 and/or continues or form transition into the edge formed by the bottom face 10 at the opposite end 121 of the elongated rib 100.

The invention claimed is:

1. A toy brick comprising:

a body part with one or more sidewalls extending around the outer periphery of said toy brick, said one or more sidewalls at least partially define an interior of said toy brick and said side-walls extend from a bottom face to a top portion of said body part, an elongated rib arranged interiorly in said body part, said elongated rib extending essentially between said bottom face towards said top portion of said body part, a width of said elongated rib, in an end portion near said top portion and parallel to a portion of a face accommodating said elongated rib, which width near said top portion is greater than or equal to the width of said elongated rib near its end, facing said bottom face, characterised in that the width of said elongated rib, in a central portion in-between said bottom face and said top portion and parallel to the portion of the face accommodating said elongated rib, is greater than the width of said elongated rib, in the end portion near said top portion, parallel to a face whereon said elongated rib is disposed.

2. A toy brick according to claim 1, wherein said elongated rib is disposed on one of said one or more sidewalls and wherein said width of said elongated rib is measured parallel to the sidewall accommodating said elongated rib.

3. A toy brick according to claim 1, wherein said elongated rib is disposed on an internal pipe in said interior defined by said body part.

4. A toy brick according to claim 1, wherein said elongated rib is, upon interconnection with another toy brick, configured to be in abutment on coupling means with the other toy brick.

5. A toy brick according to claim 1, wherein a thickness of said elongated rib, perpendicular to a face whereon said elongated rib is disposed, is greater in the end portion near said top portion of said body part than a thickness of said elongated rib, perpendicular to the face whereon said elongated rib is disposed, in an end portion near said bottom face of said body part.

6. A toy brick according to claim 1, wherein said body part constitute an essentially box-shaped body part with a top portion, a bottom face and at least two opposed and essentially parallel sidewalls extending from said bottom face to said top portion of said box-shaped body part.

7. A toy brick according to claim 1, wherein said body part include at least one coupling stud configured to extend a given height above said top portion, said coupling stud having a continuous abutment face shaped as a cylinder face whose generatrices extend approximately at right angles from said top portion of said body part to the top of said coupling stud.

8. A toy brick according to claim 7, wherein said at least one coupling stud is essentially circular.

9. A toy brick according to claim 1, wherein said elongated rib extend essentially perpendicular to a lower edge of said one or more sidewalls.

10. A toy brick according to claim 1, wherein said body part comprise a plurality of elongated ribs disposed on said inner and opposed faces of said sidewalls.

11. A toy brick according to claim 1, wherein said body part has a rectangular bottom face; and wherein said sidewalls extend from each of the sides of said rectangular underside; and wherein complementarily configured surfaces are arranged in pairs opposite each other on two parallel and opposite sidewalls.

12. A toy brick according to claim 1, wherein said toy brick constitutes a toy building brick.

\* \* \* \* \*